(12) United States Patent
Chow et al.

(10) Patent No.: US 7,484,688 B2
(45) Date of Patent: Feb. 3, 2009

(54) LANDING GEAR NOISE REDUCTION

(75) Inventors: Leung Choi Chow, Bristol (GB); Christopher Neil Wood, Congleton (GB)

(73) Assignee: Airbus UK Limited, Bristol (GB)

( * ) Notice: Subject to any disclaimer, the term of this patent is extended or adjusted under 35 U.S.C. 154(b) by 642 days.

(21) Appl. No.: 10/533,376

(22) PCT Filed: Oct. 23, 2003

(86) PCT No.: PCT/GB03/04586

§ 371 (c)(1),
(2), (4) Date: Apr. 29, 2005

(87) PCT Pub. No.: WO2004/039671

PCT Pub. Date: May 13, 2004

(65) Prior Publication Data

US 2006/0102775 A1   May 18, 2006

(30) Foreign Application Priority Data

Nov. 1, 2002   (GB)   ................... 0225517.2

(51) Int. Cl.
*B64C 25/04* (2006.01)
(52) U.S. Cl. .............................. 244/100 R; 244/110 D
(58) Field of Classification Search .................. 244/1 N, 244/100 R, 110 D, 129.4, 130
See application file for complete search history.

(56) References Cited

U.S. PATENT DOCUMENTS

| 2,176,461 | A | 10/1939 | Larsen |
| 2,180,462 | A | 11/1939 | De Seversky |
| 2,941,756 | A | 6/1960 | Roberts |
| 3,934,923 | A | 1/1976 | Lissaman et al. |
| 4,537,373 | A | 8/1985 | Butts |
| 6,786,451 | B2 | 9/2004 | Courtois et al. |

FOREIGN PATENT DOCUMENTS

| EP | 1 067 045 A1 | 1/2001 |
| EP | 1 340 676 A1 | 9/2003 |
| GB | 579657 | 8/1944 |
| GB | 568331 | 3/1945 |
| GB | 608883 | 9/1948 |
| GB | 958427 | 5/1964 |
| GB | 603804 | 6/1984 |
| WO | WO 01/04003 A1 | 1/2001 |

*Primary Examiner*—Timothy D Collins
(74) *Attorney, Agent, or Firm*—Patterson, Thuente, Skaar & Christensen, P.A.

(57) ABSTRACT

An aircraft landing gear (1) is described including a noise-reducing element that includes an air-deflecting surface, in the form of a fairing (4), and a perforated airflow-reducing region (8). In use, some air passes through the perforations, whilst other air is deflected by the fairing away from a noise-generating region of the landing gear. Noise caused by the passing of the landing gear through the air is therefore reduced.

10 Claims, 5 Drawing Sheets

LANDING GEAR NOISE REDUCTION

BACKGROUND OF THE INVENTION

The present invention relates to landing gear. In particular, the invention relates to landing gear designed to reduce the noise generated by the interaction of the landing gear and the air flowing past it during flight, take-off and/or landing.

It is desirous to minimise the noise generated by aircraft, for example, to lessen disruption or inconvenience, resulting from aircraft noise, caused to the public on the ground near airports. The interaction of the landing gear and the air flowing past it results in turbulent flows and consequently noise. A significant amount of noise is generated in this way.

SUMMARY OF THE INVENTION

It is an aim of the present invention to provide a landing gear that generates less noise compared to a landing gear of the same size that has not been adapted, designed or manufactured in accordance with the present invention.

According to the invention there is provided an aircraft landing gear including a noise-reducing element that includes an air-deflecting surface and an airflow-reducing region through which, in use, air may pass, whereby the noise-reducing element is able in use to deflect air away from a noise-generating region of the landing gear, whilst allowing some air to pass through the element, thereby reducing the noise caused by the passing of the landing gear through the air.

Thus noise caused by the interaction of the air and the landing gear caused during the approach when landing may be reduced by means of providing a noise-reducing element according to the present invention. The provision of an airflow-reducing region enables the noise-reducing effect of the noise-reducing element to be improved. Exactly how the provision of such an airflow-reducing region reduces noise has not been fully analysed, although a possible explanation relating to the reduction of the production of turbulent airflows is provided below.

We have ascertained that certain parts of the landing gear contribute greatly to the noise generated by the landing gear as it passes through the air. Deflecting air away from these parts reduces noise generated by such parts, but can result in separate air flows being created that converge downstream of the landing gear. The converging air flows interact with each other, possibly resulting in turbulent air flows that generate extra noise. Also, the provision of an element that deflects air, may have a shape that results in eddy current(s) and further turbulence being created immediately upstream of the element. Providing an airflow-reducing region may, for example, divert a portion of the airflow that would otherwise contribute to such turbulent airflows. Allowing some air to flow, or bleed, through the element via the airflow-reducing region may therefore further reduce noise that might otherwise be generated, despite there being noise generated by the interaction of the element and the air flowing through the airflow-reducing region. Thus, the noise-reducing element is advantageously configured to reduce, in use, the amount of turbulent airflow generated in the region of the landing gear.

An alternative or additional means by which the present invention might reduce noise may arise when the air deflected by the air-deflecting surface is caused to flow downstream onto or past other components of the landing gear or aircraft. In such a case, providing an airflow-reducing region may reduce the noise generated by the interaction of the high speed deflected airflows with such other downstream components, for example, by reducing the amount of air, or by reducing the speed of the air, flowing past or onto such other components.

The airflow-reducing region may, for example, therefore be considered as an airflow-bleeding region or even an airflow-bypass region in that some of (i.e. a portion and not all) the air that would otherwise be deflected by the noise-reducing element is allowed to flow through the element.

The noise-reducing element may also be configured to streamline, in use, the flow of air past the landing gear.

The airflow-reducing region may reduce the airflow that is deflected by the noise-reducing element by means of one or more appropriately positioned and shaped apertures in the element. The airflow-reducing region advantageously includes a multiplicity of apertures through which, in use, air may pass. It is believed that providing a multiplicity of apertures of a given sum area provides a greater noise-reduction effect than a single round aperture of the same area could. For example, a single round aperture of a given area might result in an air flow that interacts with a part of the landing gear to cause turbulent flows downstream, whereas twenty apertures each having an area equal to a twentieth of the area of the single hole would result in the air flow being provided over a greater area, which it is thought reduces the possibility of unwanted noise being generated. The noise-reducing element preferably includes at least 10 apertures, more preferably includes more than 20 apertures and even more preferably has more than 50 apertures. The apertures may be in the form of perforations.

The arrangement of the apertures across the air-deflecting surface may be non-uniform. It will of course be understood that the arrangement of the apertures as a whole may be non-uniform or irregular whilst at least one substantial portion of the air-deflecting surface has a regular or uniform arrangement of apertures. The non-uniformity of the apertures may merely be as a result of the apertures not being distributed evenly across the air-deflecting surface. For example, the air-deflecting surface may include a centre portion having a uniform arrangement of apertures and a peripheral portion having no apertures, such that the arrangement of the apertures across the air-deflecting surface as a whole is non-uniform. Furthermore, there may be one or more areas having no apertures, each area being disposed between regions having apertures. Such areas (having no apertures) may for example be needed in positions where the noise-reducing element has a structural function (for example there may be flanges or stiffeners on the rear surface of the noise-reducing element), where the provision of apertures would not be desirable.

The air-deflecting surface may include a first region encompassing no apertures and a second region encompassing at least ten apertures, the area covered by the first region having a minimum dimension that is at least as great as the maximum dimension of the area covered by the second region. The second region may for example be in or near the middle of the air-deflecting surface. The first region may for example be near to the periphery of the air-deflecting surface.

Preferably the airflow-reducing region is disposed between two regions defined by the air-deflecting surface. The airflow-reducing region is preferably surrounded on all sides by the rest of the air-deflecting surface. The airflow-reducing region may thus not extend to the edge of the air-deflecting surface.

There may be more than one airflow-reducing region on the noise reducing element. There may for example be a plurality of discrete airflow-reducing regions. Such discrete airflow-reducing regions could of course be considered as being separate sub-regions of a single airflow-reducing region.

Similarly, the air-deflecting surface may comprise separate discrete surfaces that together form a single, albeit with discontinuities, air-deflecting surface.

The or each aperture is preferably round in cross-section. Other shapes could of course be used, but round holes are easily machined.

The or each aperture is preferably formed such that the portion defining the part of the aperture on the surface that in use faces the airflow (i.e. the upstream surface) has substantially no sharp edges. Sharp edges might, under certain conditions, generate extra noise. Preferably, that portion has substantially no edges defined by surfaces meeting at angles of 90° or less. The or each aperture is preferably countersunk on the surface that in use faces the airflow (i.e. the upstream surface).

The passageway through the noise-reducing element defined by each aperture preferably flares out towards the surface that in use faces the airflow (i.e. the upstream surface). It is preferred that the passageway also has a portion of substantially constant cross-sectional area.

The airflow-reducing region may have a volume of free space permitting the flow of air through the noise-reducing element and a volume of solid material defining the volume of free space. The airflow-reducing region may be considered as having a porosity. For example, the porosity may be defined as the percentage of free space to the total volume occupied by the airflow-reducing region. The porosity of the airflow-reducing region is preferably in the range from 10% to 60% and more preferably between 20% and 50%.

Advantageously, the sum of the cross-sectional area of all of the apertures (at their narrowest) in the airflow reducing region is equal to a percentage (hereinafter the perforation percentage) in the range from 10% to 60% of the total area of the airflow-reducing region. Preferably, the average width of the air-deflecting surface between adjacent apertures is wider than the average minimum dimension of the apertures. More preferably, the perforation percentage is between 20% and 50%. Yet more preferably, the perforation percentage is in the range from 40% to 45% (inclusive), and even more preferably is in the range from 42% to 44% (inclusive). In an embodiment described below the perforation percentage is about 44%.

The perforation percentage is preferably chosen so that, in use at normal speeds on approach when landing, the relative speed of the air immediately behind the airflow-reducing region is between 20% and 80% of the relative air speed in front of the airflow-reducing region. The perforations may be arranged such that the percentage reduction in air speed is between 25% and 75% and more preferably between 30% and 70%. In the embodiment described below, the percentage reduction is between 40% and 60%. The percentage reduction may be less than 50%.

Preferably, the hole diameter and perforation percentage are chosen, so that, at a typical landing approach speed, the air flowing through and behind the airflow-reducing region is not turbulent, or at least, is such that turbulence is low relative to the turbulence that would be caused downstream if the noise-reducing element did not include the airflow-reducing region.

The perforation percentage is preferably chosen such that, in use at normal speeds on approach when landing, the airflow-reducing region has a steady flow-resistance within the range 10 to 200 MKS Rayls ($N.s.m^{-3}$) and more preferably within the range of 20 to 100 MKS Rayls.

The airflow-reducing region preferably covers an area, which would, if the airflow-reducing region were replaced with an extension of the air-deflecting surface, cover at least one stagnation point or cover at least the majority of a stagnation line. The airflow-reducing region may be so shaped as to only cover one or more stagnation points/lines, preferably all the stagnation points/lines, and the or each region immediately surrounding the or each stagnation point/line. Alternatively, the area covered by the airflow-reducing region may be significantly greater than that required to cover the or each stagnation line/point. The coverage of the airflow-reducing region will of course depend not only on the shape and configuration of the noise-reducing element, but also on the positioning of the noise-reducing element in relation to the noise-generating parts of the landing gear/aircraft. For example, if the noise-reducing element is being used to shield a bogie undertray, control of the airflow downwards is not critical, whereas proper control of any airflows being deflected upwards will be important. Such a noise reducing element would benefit from an arrangement wherein the airflow-reducing region reduces the amount/speed of air deflected upwards.

The airflow in the vicinity of the stagnation point may under certain conditions be turbulent.

Of course, even with the provision of such one or more apertures, stagnation points may still occur. However, the presence of such apertures near any such stagnation point may allow some air to escape through the aperture thereby reducing the flow velocity of the deflected airflows, thus further reducing noise.

The or each aperture may be in the form of a gap, hole, passageway, opening or other means that allows air to flow through the noise-reducing element as opposed to being deflected by it. It will be understood that, whilst preferred, the or each aperture need not for example be bounded on all sides. For example, the apertures may be linked by elongate paths formed by other apertures. The or each aperture need not be regular in shape. Indeed, one aperture may be so shaped to form a multiplicity of sub apertures.

The noise-reducing element is preferably so arranged that in use it shields at least a part of the landing gear. The noise-reducing element is preferably in the form of a fairing that covers at least a part of the landing gear, when the landing gear is in a position in which it is able to support part of the weight of the aircraft on the ground. Said part of the landing gear may for example be a part of the landing gear that has been identified as contributing to the generation of unwanted noise during landing. Said part of the landing gear may be in the region of a steering column of a nose gear, a tow-bar, the underneath of a bogie of a main landing gear, an articulated linkage, one or more rods, a brake actuator, a steering actuator, a door that in its closed position covers the aperture through which the landing gear passes when being deployed, and/or a dragstay.

More than one noise-reducing element may be provided on a single landing gear. Preferably, two or more noise-reducing elements are provided, each noise reducing-element including an air-deflecting surface and an airflow-reducing region through which, in use, air may pass. Each additional noise-reducing element may include any combination of the features described above with reference to noise-reducing element of the landing gear of the present invention. The or each noise-reducing element may be formed of separate component parts. The or each noise-reducing element may alternatively be unitary in construction. The air-deflecting surface may for example be a monolithic structure.

The present invention is of particular application on large aircraft, particularly passenger-carrying aircraft. For example, the landing gear is preferably of a size suitable for use on an aircraft designed to carry more than 50 passengers, and more preferably more than 100 passengers. Such aircraft generally have retractable landing gear assemblies.

The landing gear is preferably movable from a stored position to an operative position.

The present invention also provides an aircraft including a landing gear according to any aspect of the above-described invention.

The present invention also provides a method of reducing noise caused by landing gear on an aircraft including a step of manufacturing a landing gear according to any aspect of the above-described invention. Such a method advantageously includes a step of modifying an existing design in order to reduce noise caused by the landing gear.

There is also provided a noise-reducing element for use on an aircraft landing gear, the noise-reducing element including an air-deflecting surface and an airflow-reducing region through which, in use, air may pass, whereby the noise-reducing element is able in use to deflect air away from a noise-generating region of the landing gear, whilst allowing some air to pass through the element, thereby reducing the noise caused by the passing of the landing gear through the air. The reduction of noise may for example be effected by means of the reduction of the velocity of deflected airflows.

The noise-reducing element may of course be so configured that it is suitable for use as the noise-reducing element of an aircraft landing gear according to any aspect of the above-described invention.

DESCRIPTION OF THE DRAWINGS

Embodiments of the present invention will now be described by way of example with reference to the following schematic drawings of which.

DETAILED DESCRIPTION

Figure 1:
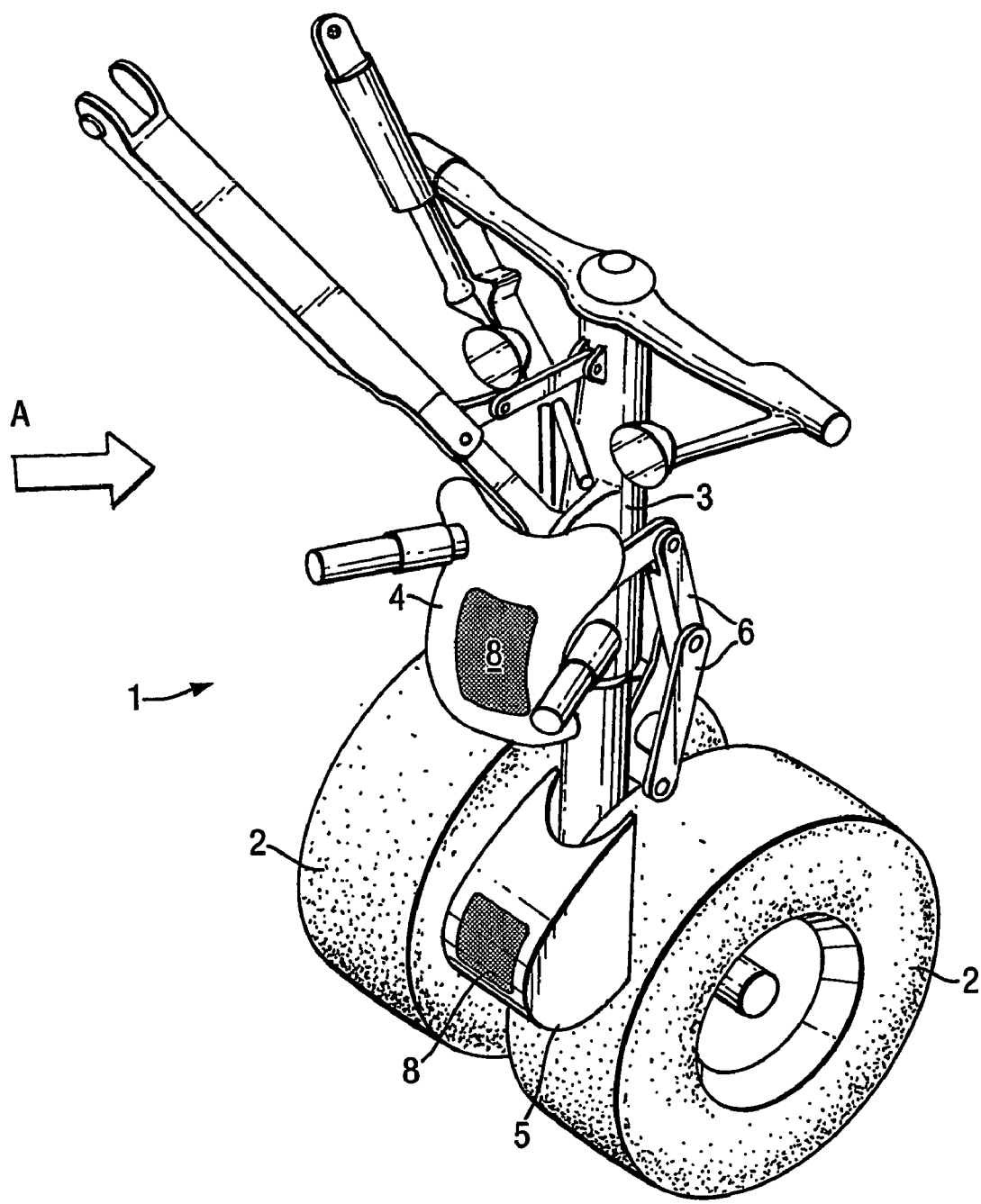
FIG. 1 shows in perspective view a nose landing gear with fairings.

FIG. 1 illustrates a first embodiment of the invention concerning a nose landing gear 1. The nose landing gear 1 includes wheels 2 a central support column 3 (or leg) and an upper fairing 4 and a lower fairing 5. The nose gear 1 is shown in its deployed position during landing of an aircraft (not shown in FIG. 1) to which the nose landing gear 1 is attached. The direction of flow of air relative to the nose gear is indicated by arrow A which points to the right in FIG. 1, since the nose gear and aircraft are moving to the left.

The upper fairing 4 is positioned over the central support column 3 in a position that shields parts 6 of the landing structure that are associated with the steering of the nose gear wheels 2. The parts 6 that are shielded by the fairing include steering actuators (comprising rods, linkages and the like) that would if not shielded generate significant noise. The upper fairing 4 is attached to the gear 1 via steering actuator mounting brackets. The upper fairing 4 has regions of both positive and negative curvature, and in the region at the front of the fairing, the fairing is saddle-shaped.

The lower fairing 5 is positioned over and therefore shields a tow-bar (hidden from view in FIG. 1) and jacking structure.

The tow-bar, which is positioned between the fairing 5 and the central support member 3, may be used to tow the aircraft when the aircraft is on the ground and the jacking structure enables the aircraft to be jacked up by its nose gear to enable the nose wheels 2 to be serviced. Access to the tow bar and jacking structure is facilitated by means of a door (not shown in FIG. 1) in the lower fairing 5. The tow bar and jacking structure would also, if not shielded, generate significant noise. The lower fairing does not have any regions having a curvature resembling a saddle.

Each fairing 4, 5 has an aerodynamically-streamlined profile shaped so that the air approaching the fairing is deflected by the fairing away from the part of the landing gear that it shields. The fairings are generally convex in shape as viewed in the direction of arrow A and are made from sheet aluminium having a thickness of 1.6 mm.

Figure 2:
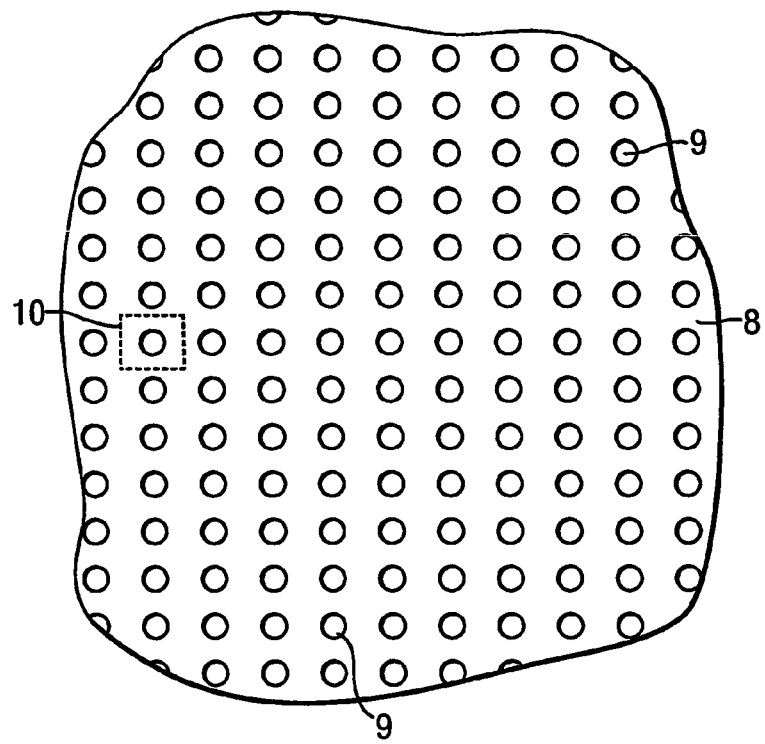
FIG. 2 shows a view of a region of a fairing of FIG. 1.

Each fairing also has a perforated region 8 indicated by the shaded regions in FIG. 1. The perforated region is shown schematically in plan view in FIG. 2. The region shown in FIG. 2 is a region of perforations formed in a flat plane (the plane being flat for the sake of clarity); it will of course be appreciated that most, if not all, of the perforated regions 8 on the fairings 4,5 are non-planar. The perforations are in the form of round holes formed in the fairing and are arranged in a square matrix of notional unit cells 10, each unit cell having a perforation in its centre. The cross-sectional area of a perforation varies along its length. The area decreases substantially constantly with length from the front face (in the direction of travel of the fairing) to a given depth (for example between ¼ and ⅓ of the length of the hole that defines the perforation—i.e. the thickness of the fairing). After that given depth the cross-sectional area of the perforation is substantially constant up to the back face. The perforations are thus in the form of countersunk holes, which are easily and readily formed in a blank fairing (or one or more sheets of aluminium to be made into a fairing) by drilling.

The diameter of each hole on the front face is 4.3 mm. The diameter reduces to 3.5 mm at a depth from the front surface of 0.4 mm (i.e. the hole flares out at an angle of 45°). The fact that the holes are countersunk on the front face means that there are no sharp edges presented to the incident airflow. If the holes were not countersunk, the sharp edges of the holes on the front face could cause oscillations in the airflow, thereby generating unwanted noise.

The notional unit cells 10 of the perforated region 8 have a width and height of 4.7 mm. The perforations each have a diameter of 3.5 mm at their narrowest. Thus adjacent perforations are separated by 1.2 mm (their centres being separated by 4.7 mm). The percentage of the area of the perforated region that is perforated (taking the minimum cross-sectional areas of the perforations) is 44%, the remaining 56% being formed of solid material (the same material as the rest of the fairing). The percentage of the area of the perforated region that is perforated (taking the maximum cross-sectional areas of the perforations) is 66%.

The perforated regions 8 are so shaped and positioned on the fairings that they do not extend all the way to the edge of the fairing but do cover the point, which if the fairing were not perforated in the perforated region, would form a stagnation point.

The term stagnation point is well known in the art. By way of example, and in relation to the present embodiment, the term may simply be defined as the point on the fairing at which it may be considered the air impacting against the fairing divides. Alternatively, as a very simple approximation, the stagnation point on a surface that is travelling in a given direction may be considered as being the point at which the normal to the surface is parallel to the direction of travel. Thus a given surface may have several stagnation points or the surface may have an infinite number of stagnation points, forming a stagnation line or even a stagnation area. Also, the position of the or each stagnation point will vary with the direction of relative motion between the surface and the fluid through which it moves.

The fairings are of course adequately vented so as not to prevent or hinder the flow of air through the perforations. In particular, the structure is so shaped, in relation to the rest of the aircraft downstream, that a given unit volume of air that flows through the perforations in the perforated region does not pass through an effective constriction downstream having an area smaller than the effective area of constriction of the perforated region through which the air passed. The fairing is in particular not a closed fairing.

On landing the aircraft, the speed of the air relative to the nose landing gear will for example be about 85-90 ms$^{-1}$ (i.e. roughly equal to the ground to air speed). During the approach, when the nose gear 1 has been deployed, the air flowing towards the fairings 4, 5 is partly divided and deflected away from the components of the landing gear that the fairings shield. However, some of the air passes (or "bleeds") through the fairings 4, 5 via the perforations 9 in the perforated regions 8. The air that passes through the fairings 4, 5 in this way is slowed down, by means of the friction between the fairing in the perforated region 8 and the air. The speed of the air relative to the fairing 4, 5 on the rear side of the fairing immediately behind the perforated regions 8 might for example be about 40% to 50% of the speed of the air relative to the fairing in front of the nose gear 1. The noise generated by the passing of this air over the components that are otherwise shielded by the fairings is less than the extra noise that would be generated by the airflows deflected by the fairing had the perforations not been provided in the fairing.

The countersinking of the perforations helps reduce the chances of resonance of the fairing at certain conditions which could cause extra unwanted noise at certain frequencies.

Figure 3:
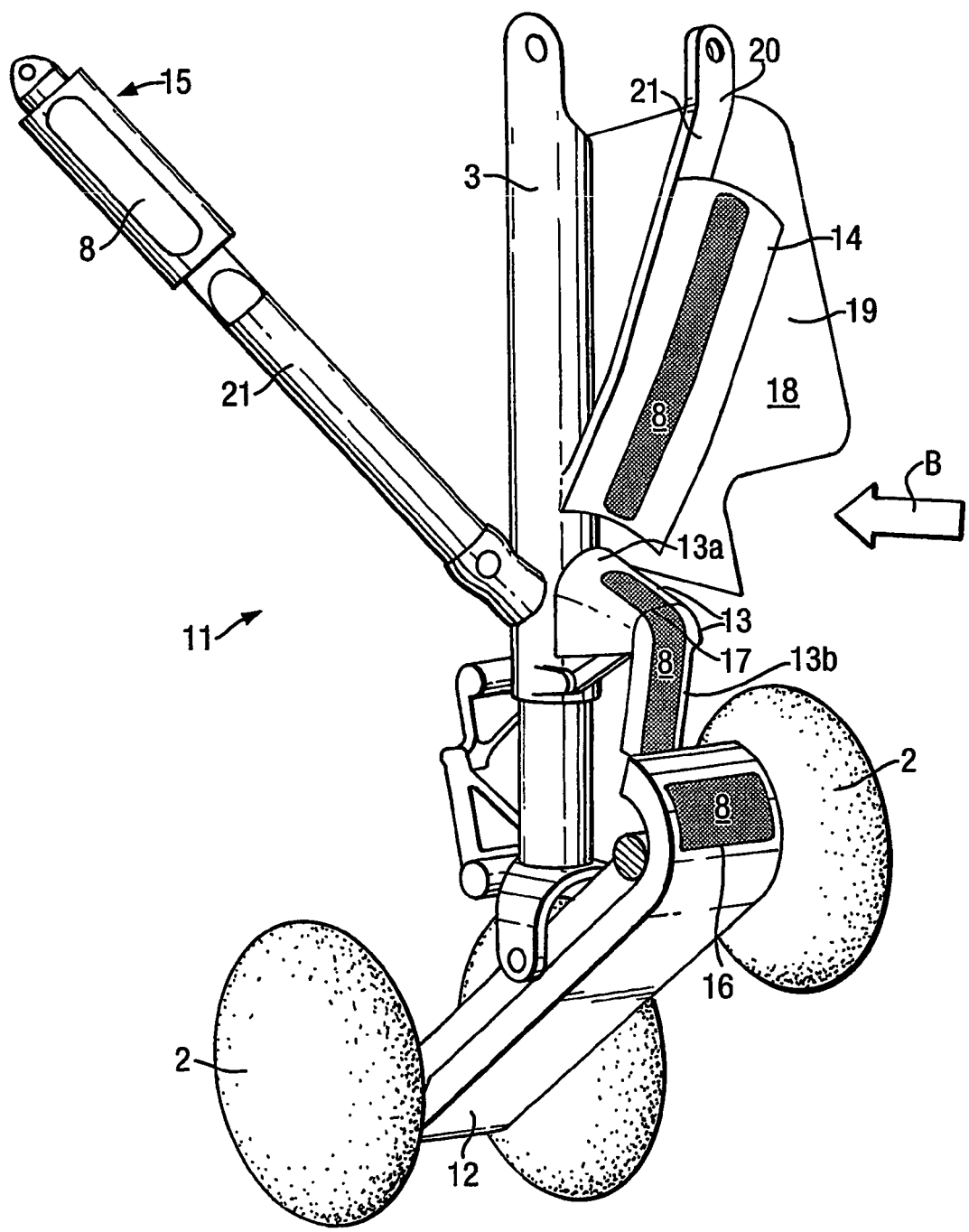
FIG. 3 shows in perspective view a main landing gear with fairings.

A second embodiment of the invention is shown in FIG. 3, which shows a main landing gear 11 including wheels 2 and a central support column 3 (or leg). The gear 11 includes several fairings 12, 13, 14, 15. The main gear 11 is shown in its deployed position during landing of an aircraft (not shown in FIG. 3) to which the main landing gear 11 is attached. The direction of flow of air relative to the landing gear is indicated by arrow B which points to the left in FIG. 3, since the main landing gear and aircraft are moving to the right.

The fairings illustrated in FIG. 3 include an undertray fairing 12, an articulation-link fairing 13, a door/dragstay-closure fairing 14 and an upper side-stay fairing 15. Each fairing includes, in a manner similar to that of the fairings shown in FIG. 1, a perforated region 8 which covers a stagnation point or part of a stagnation line. Thus the principles behind and improvements provided by the arrangement of the fairings shown in FIG. 3 and the perforated regions 8 thereon are the same as those described with reference to FIG. 1.

The undertray fairing 12 is a large single curvature cover that shields the underneath of the main landing gear bogie and brake rod area. The fairing 12 includes a forward-facing raised area 16 that has a streamlined shape which thus presents a smoother surface to the air than the landing gear would present without the fairing 12. The fairing 12 is clamped to both the bogie beam and the axles (not shown clearly in FIG. 3). The fairing 12 includes flush, removable doors (not shown for the sake of clarity in FIG. 3) that allow ready access to the undercarriage jacking structure and access to facilitate servicing of the wheels 2.

The articulation-link fairings 13 include an upper fairing 13a and a lower fairing 13b. The fairings 13a, 13b together cover and shield the gear-articulation-link mechanisms and jack. The fairings 13a, 13b are both clamped to their respective articulation links and are joined by an aerodynamic seal indicated by joint 17 in FIG. 3. Also the positioning of the lower-articulation-link fairing 13b is such that its lower end co-operates with the upper surface of the undertray fairing 12, when the bogie of the main landing gear is positioned in the trimmed position for landing (the position shown in FIG. 3).

The door/dragstay-closure fairing 14 shields the landing gear in the region between the dragstay 20 and the inner surface 18 of the main landing gear door 19. The fairing is shaped to provide an aerodynamically-smoother profile than would be provided if the forward flat surface 21 of the dragstay 20 were unfaired. The fairing 14 is also shaped such that it allows the side stay 21 to fold into the fairing 14 when the landing gear 11 is retracted and stowed.

The upper side-stay fairing 15 shields the otherwise flat surface of the upper part of the side stay 21 and again provides a more aerodynamically-acceptable surface than the bare sidestay 21. The fairing 15 also covers the gear actuation springs (not shown in FIG. 3).

Each fairing, in a manner similar to the first embodiment, is made from aluminium sheet material. The perforated regions 8 are similar to those of the perforated regions described with reference to the first embodiment, those regions being illustrated schematically by FIG. 2.

Figure 4:
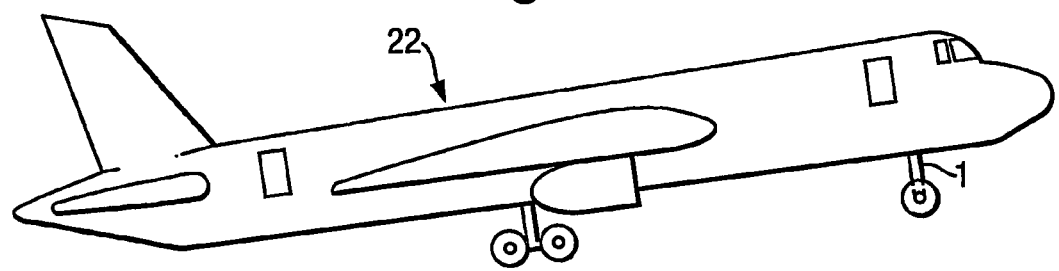
FIG. 4 shows an aircraft including both a nose landing gear as shown in FIG. 1 and two main landing gear as shown in FIG. 2, and FIGS. 5 to 8 relate to a method of choosing the percentage perforation of a region of the fairing.

FIG. 4 shows a third embodiment of the present invention relating to an aircraft 22. The aircraft 22 includes a nose landing gear 1 in accordance with the first embodiment and two sets of main landing gears 11 in accordance with the second embodiment of the invention (only one set of main landing gear 11 being shown in FIG. 4 for the sake of clarity). The aircraft 22 having landing gears that are provided with fairings having perforated regions as described above may result in the noise generated by the aircraft on its approach when landing being substantially reduced.

It will be readily apparent to the skilled person that various modifications may be made to the above-described embodiment without departing from the spirit of the invention. For example, fewer or greater fairings may be provided and/or the function provided by two or more fairings may be provided by a single fairing if possible.

The cross-sectional area of each perforation need not vary along its length through the fairing and could instead be substantially constant. Also, the perforation could include a portion that flares from a given depth to the rear face of the fairing, so that the perforations are in the form of holes that are countersunk on both faces of the fairing.

Other patterns of holes could be used. For example, the perforations may be arranged in a matrix, where each perforation if formed in the centre of a notional unit cell in the shape of a regular hexagon. An irregular arrangement of perforations may even be implemented.

The diameter, and spacing of the perforations (and consequently the percentage of the perforated region that is perforated) may be adjusted to suit a particular aircraft and/or to suit a chosen range of aircraft-to-ground speeds on landing. For example, the optimum percentage of perforation is thought to be dependent on the relative speed of the fairing and the air. Different size and shape of aircraft, and different landing speeds, may therefore affect the ideal percentage of perforation. One method of choosing the perforation percentage is described below, purely by way of example only, with reference to FIGS. 5 to 8.

Figure 5:
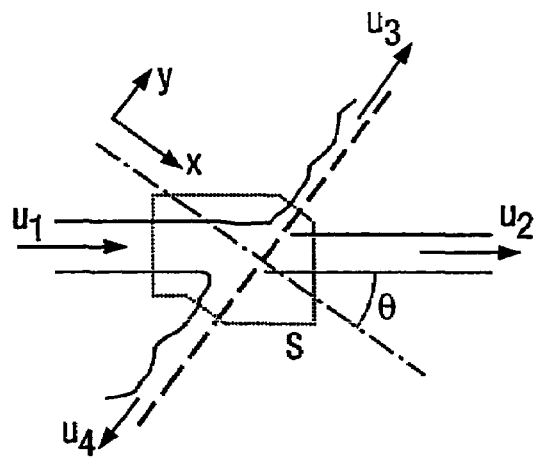
Figure 6:
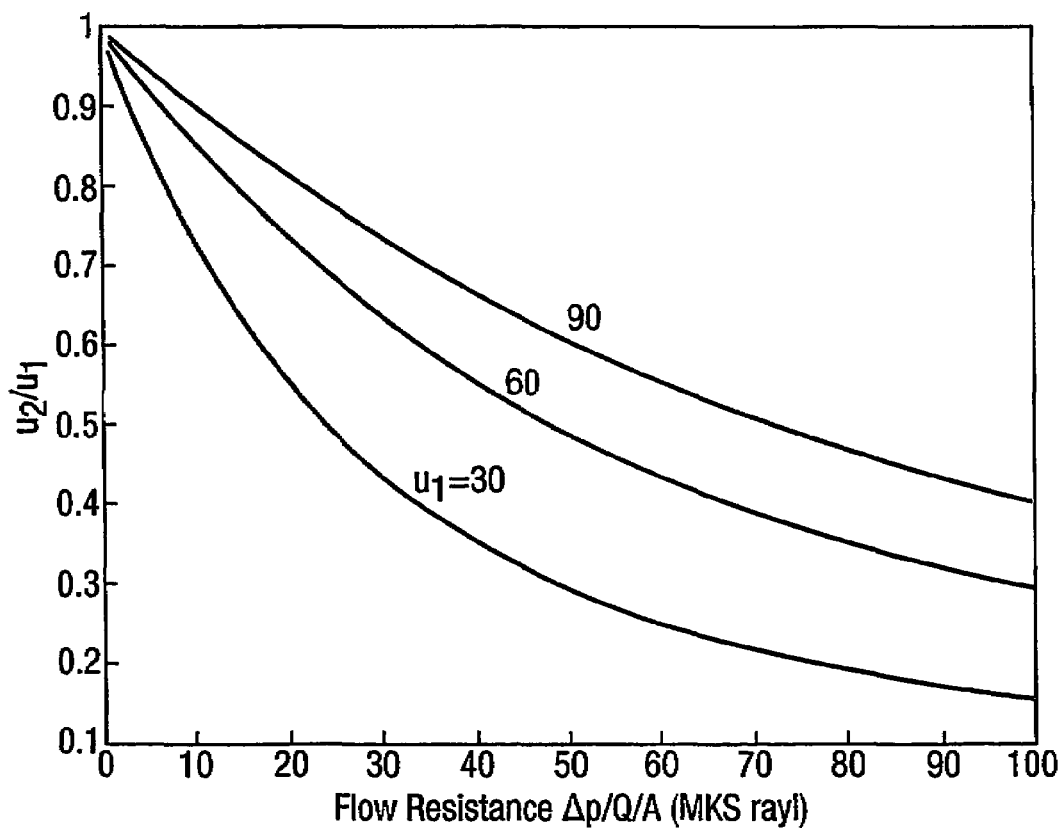
Figure 7:
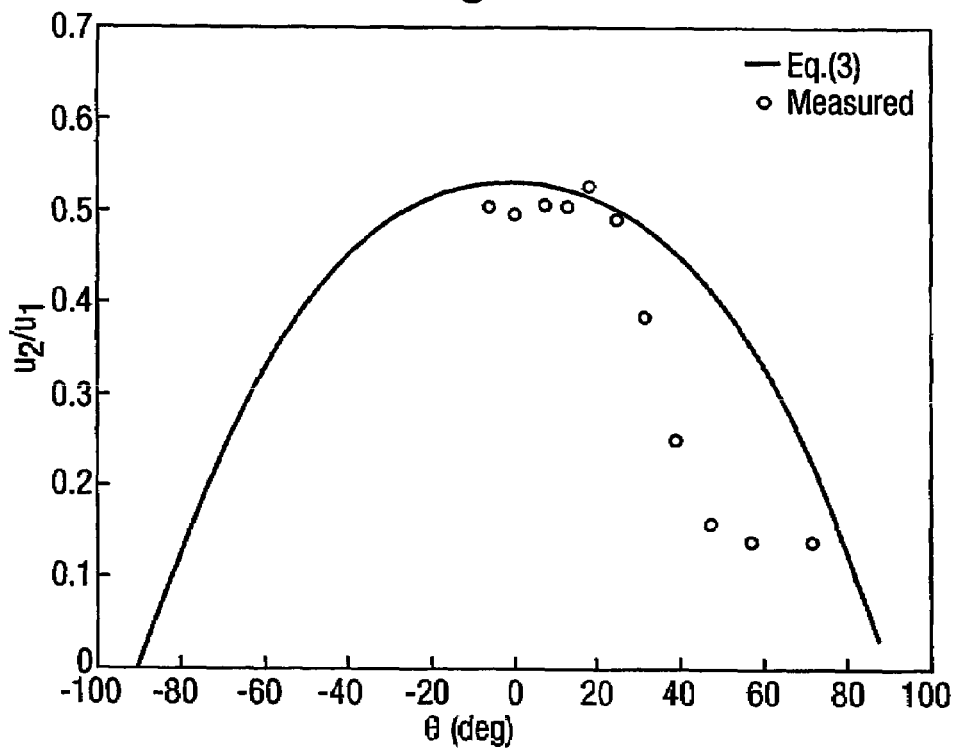
Figure 8:
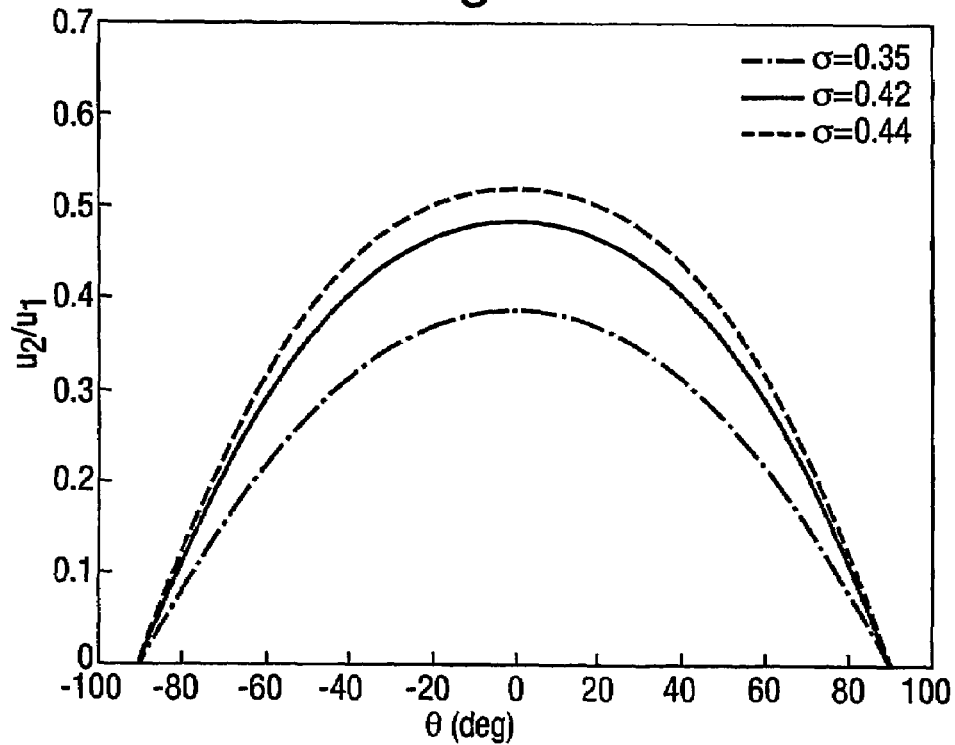

FIG. 5 shows a perforated plate in a flow stream of velocity $u_1$, FIG. 6 shows a graph of downstream to upstream velocity ratio as a function of DC flow resistance and upstream velocity, FIG. 7 shows a graph of u-component of the velocity distribution across scan plane for a half-cylinder perforated shell as measured in a wind tunnel test (only half of the measurements data points being shown since they are approximately symmetric), and FIG. 8 shows a graph of predicted flow distribution across scan plane for $u_1$=90 m/s, and 3 different open-area coefficients.

The publication Massey, B. S. *Mechanics of Fluids*. $5^{th}$ ed. Van Nostrand Reinhold(UK), 1983 addresses the problem of a jet of fluid incident at an angle $\theta$ to a rigid surface, assuming inviscid, incompressible and irrotational flow. A similar approach is followed for the current problem but the surface is now perforated so that some fluid can flow through it. This situation is shown in FIG. 5.

The rate at which momentum enters the control volume enclosed by S in the direction perpendicular to the plate is $$\int \rho u_1 u_{1x} dA = \rho A u_1^2 \cos\theta$$

and the rate at which it leaves the volume in the x direction is $$\int \rho u_2 u_{2x} dA = \rho A u_2^2 \cos\theta$$

where $u_{ix}=u_i \cos\theta$ is the velocity component in the x direction. By Newton's second law, the excess in momentum rate in the x direction across the surface S is equal to a force $F_x$ on the perforate surface such that $$F_x = (p_2 - p_1)A = -\rho A \cos\theta (u_2^2 - u_1^2) \quad (1)$$

According to the publication Ingard, K. U. *Notebook #3 Notes On Sound Absorption Technology*. Ver94-02. Noise Control Foundation, N.Y., 1994 for a thin perforated surface the (velocity dependent) steady flow resistance $r_{DC}$ is given by:

$$r_{DC}(u_{or}) \equiv \frac{\Delta p}{u_{or}} \quad (2)$$

where $\Delta P$ is the pressure drop across the plate and $u_{or}$ is the mean flow velocity through the orifices. We assume here that for a perforated plate of open-area coefficient $\sigma$ the velocity in the orifices $u_{or}$ can be approximated by $$u_{or} \approx \frac{u_2}{\sigma}$$

Multiplying eq. (1) by eq. (2) to give a quadratic equation in $u_2$, choosing the solution with the positive square root and rearranging gives $$\frac{u_2}{u_1}(r_{DC}, u_1, \theta) \approx \Omega(r_{DC}, u_1, \theta) \left( \sqrt{1 + \frac{1}{\Omega(r_{DC}, u_1 \theta)^2}} - 1 \right) \quad (3)$$

where $$\Omega(r_{DC}, u_1, \theta) = \frac{r_{DC}}{2 u_1 \sigma \rho \cos\theta}.$$

FIG. 6 shows $u_2/u_1$ as a function of r for different incidence velocities and normal incidence ($\theta=0°$).

The calculations made here are for a perforated plate, the perforations being arranged in a hexagonal matrix and having a pitch p=5.0 mm and orifice diameter $d_{or}$=3.5 mm. For the hole pattern of this material the porosity of the material is given by:

$$\sigma \approx \left( .95 \frac{d_{or}}{p} \right)^2 \approx 0.44.$$

The free stream velocity in the wind tunnel was $u_1$=60 m/s, and we approximate the velocity in the orifices by $$u_{or} = \frac{u_1}{\sigma} \approx 136 \text{ m/s}$$

giving a Reynolds number $$Re = \frac{u_{or} d_{or}}{\nu} \approx 3.1 \times 10^4$$

which, according to the publication Idelchick, I. E. *Handbook Of Hydraulic Resistance*, $2^{nd}$ ed. Hemisphere Publishing Corp. 1986 determines the flow across the perforate to be in a transitional region, between laminar and fully turbulent flow. Thus using diagram 8-5 of the Idelchick reference we calculate the resistance coefficient $$\zeta = \frac{\Delta p}{1/2 \rho u_1^2} \approx \zeta_\phi \frac{1}{\sigma^2} + \overline{\epsilon}_{0Re} \zeta_{1qu}$$

where $\zeta_\phi$=f(Re,$\sigma$) accounts for 'laminar' viscous losses, $\overline{\epsilon}_{0Re}$ is a factor Reynolds number dependant, and $\zeta_{1qw}$ is the resistance coefficient for fully turbulent flow (Re>$10^5$). The above are read from a graph or table to give $$\zeta \approx 0.02 \frac{1}{0.45^2} + 0.82 \times 6.45 \approx 5.4$$

In order to relate this resistance coefficient with the DC flow resistance defined above we can write $$\zeta = \frac{\Delta p}{1/2 \rho u_1^2} \approx \frac{\Delta p}{1/2 \rho (u_{or} \sigma)^2} = \frac{2 r_{DC}}{\rho u_{or} \sigma^2} \approx \frac{2 r_{DC}}{\rho u_2 \sigma}$$

and rearranging and assuming $u_2 \approx 0.5 u_1$ $$r_{DC} \approx \frac{1}{2}\zeta\rho u_2 \sigma \approx 43 rayls (MKS)$$

FIG. 6 confirms that for $u_1$=60 m/s and a DC flow resistance $r_{DC}\approx$43rayl(MKS), the predicted velocity $u_2$ downstream of the perforated plate should indeed be around half of $u_1$, in fact $u_2\approx 0.54 u_1\approx 32.4$m/s. If this was not the case, further guesses for $u_2$ would have to be made and the last steps iterated until agreement is achieved. FIG. 7 compares the prediction of eq. (3) as a function of angle $\theta$ with some data points read from the results of the measurements on the perforated plate. The agreement is good up to angle $\theta=\pm 25°$, after which the assumption of negligible mass flow tangential to the plate is no longer acceptable.

The former calculation is now reversed in order to (tentatively) specify the perforated plate for flight conditions. Because of the non-linear equations involved it is necessary to use an iterative procedure. Setting $$u_1 = 90 \text{ m/s}$$
$$\frac{u_2}{u_1} = 0.5$$
$$d_{or} = 3.5 \text{ mm}$$

then, from FIG. 6 read $r_{DC}\approx$72rayl, and an initial trial guess for $\sigma_0$=0.35 gives $$\zeta \approx \frac{2 r_{DC}}{\rho u_2 \sigma} \approx 7.62$$

The Reynolds number is $$Re = \frac{\frac{90}{0.35} \times 3.5 \times 10^{-3}}{15.1 \times 10^{-6}} \approx 6 \times 10^4$$

and from diagram 8-5 in of the Idelchick reference $$\left.\begin{array}{l}\varepsilon_{0Re} \approx 0.91 \\ \zeta_\phi \approx 0.02\end{array}\right\}\zeta_{1qu} \approx \frac{\zeta - \frac{\zeta_\phi}{\sigma^2}}{\varepsilon_{0Re}} \approx 8.2.$$

Finally, from diagram 8-1 in of the Idelchick reference we can read the free-area coefficient corresponding to this resistance coefficient:

$$\zeta_{1qw}=8.2 \rightarrow \sigma \approx 0.39$$

which is not in agreement with our initial guess.

If we try as a second iteration for $\sigma_1$=0.42, the same calculation gives the correct value $$\zeta_{1qw}\approx 6.8 \rightarrow \sigma \approx 0.42$$

FIG. 8 compares the predicted velocity distribution from eq. (3) for a perforate plate with $\sigma$0.35, $\sigma$=0.42, and $\sigma$=0.44 for the flight conditions specified.

Since the diameter of the orifices was fixed at 3.5 mm, an assuming a staggered arrangement of holes, the pitch required to give each porosity is $$\text{pitch} = p = \frac{0.95 d_{or}}{\sqrt{\sigma}} = \begin{cases} 5.62 \text{ mm} & \Leftarrow \sigma = 0.35 \\ 5.13 \text{ mm} & \Leftarrow \sigma = 0.42 \\ 5.01 \text{ mm} & \Leftarrow \sigma = 0.44 \end{cases}$$

From FIG. 7 it is concluded that the model is in reasonable agreement with the data measured.

From FIG. 8 it is concluded that, assuming a hole size of 3.5 mm, the appropriate percentage open area for the flight condition is in the range 42%-44%. For the staggered hole arrangement of the original test sample (to be specified in detail) the appropriate hole pitch is thus 5.01 mm-5.13 mm. This specification is virtually identical to the material tested in wind tunnel tests.

The method described above with reference to FIGS. 5 to 8 is provided by way of example only to illustrate the issues that preferably need to be considered when choosing the arrangement and size of the perforations. It will of course be appreciated that other methods could be employed to specify the perforation pitch and diameter, and therefore the aerodynamic porosity. For example, wind tunnel tests and/or computer simulations could be utilised to obtain acceptable values by trial and error.

Adjacent perforations could be connected by long and thin apertures such that a plurality of perforations could be considered as forming a single, albeit complexly-shaped, hole.

The fairing could be made from materials other than aluminium or alloys thereof. For example, the fairing could be made from carbon fibre or glass fibre composite materials or even plastic material.

It is also thought that the provision of a mesh might provide even better results in terms of noise reduction. The mesh would be provided in front of the fairing and would, in particular, cover the region that is perforated. The gauge of the mesh would be much finer than the diameter of the perforations. For example, it is envisaged that a gap size in the mesh of 0.1 mm to 2 mm would be preferable. The mesh would further enhance the effect of the fairing of reducing the air velocity behind the fairing whilst letting some air through. The mesh could be arranged as a renewable item and as such would be removably mounted in relation to each fairing. A wire mesh would be suitable. The thickness of the wire or material forming the mesh should be as low (thin) as possible, but must of course be great enough for the mesh to be able to cope with the harsh environment (i.e. high air velocities) that the mesh would be subjected to on landing. The thickness could be between 0.01 mm to 1 mm. A thickness of less than 0.1 mm is preferable. The dimensions of the mesh may be similar to those of a conventional mosquito net. It is preferred that the mesh has a flow resistance, at approach speeds, of less than 200 MKS Rayls and preferably in the range of 10 to 100 MKS Rayls.

Of course, the invention is applicable to all aircraft where unwanted noise is an issue. As such, the present embodiment could of course be applied to aircraft having landing gear arrangements different from those described above with reference to the accompany drawings.

The invention claimed is:

1. An aircraft landing gear including a noise-reducing element that includes
an air-deflecting surface wherein said air-deflecting surface includes a first region encompassing no apertures and a second region encompassing at least ten apertures, the area covered by the first region having a minimum dimension that is at least as great as the maximum dimension of the area covered by the second region, and an airflow-reducing region having more than 10 apertures through which, in use, air may pass, whereby the noise-reducing element is able in use to deflect air away from a noise-generating region of the landing gear, whilst allowing some air to pass through the element, thereby reducing the noise caused by the passing of the landing gear through the air.

2. An aircraft landing gear according to claim 1, wherein the 15 noise-reducing element includes at least 50 apertures.

3. An aircraft landing gear according to claim 1, wherein the apertures are in the form of perforations.

4. An aircraft landing gear according to claim 1, wherein the arrangement of the apertures across the air-deflecting surface is non-uniform.

5. An aircraft landing gear according to claim 1, wherein the first region is near to the periphery of the air-deflecting surface.

6. An aircraft landing gear according to claim 1, wherein the airflow-reducing region is disposed between two regions defined by the air-deflecting surface.

7. An aircraft landing gear according to claim 1, wherein the airflow-reducing region covers an area, which would, if the airflow-reducing region were replaced with an extension of the air-deflecting surface, cover at least one stagnation point or cover at least the majority of a stagnation line.

8. An aircraft landing gear according to claim 1, wherein the noise-reducing element is so arranged that in use it shields at least a part of the landing gear.

9. An aircraft landing gear according to claim 1, wherein the noise-reducing element is in the form of a fairing that covers at least a part of the landing gear.

10. An aircraft landing gear according to claim 1, wherein the landing gear is movable from a stored position to an operative position.

* * * * *

UNITED STATES PATENT AND TRADEMARK OFFICE
CERTIFICATE OF CORRECTION

PATENT NO.         : 7,484,688 B2                                      Page 1 of 1
APPLICATION NO.    : 10/533376
DATED              : February 3, 2009
INVENTOR(S)        : Chow et al.

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by (642) days Delete the phrase "by 642 days" and insert -- by 639 days --

Signed and Sealed this

Third Day of November, 2009

David J. Kappos
*Director of the United States Patent and Trademark Office*